US009182965B2

(12) United States Patent
Khushraj

(10) Patent No.: US 9,182,965 B2
(45) Date of Patent: Nov. 10, 2015

(54) METHOD AND APPARATUS FOR DEVELOPING SOCIALLY SUITABLE APPLICATIONS AND DEVICES

(75) Inventor: Deepali Khushraj, Arlington, MA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 144 days.

(21) Appl. No.: 13/285,793

(22) Filed: Oct. 31, 2011

(65) Prior Publication Data

US 2013/0111463 A1    May 2, 2013

(51) Int. Cl.
*G06F 9/445* (2006.01)
(52) U.S. Cl.
CPC ........................... *G06F 8/61* (2013.01)
(58) Field of Classification Search
CPC .............. G06F 8/60; G06F 8/61; G06F 8/63; G06F 8/65; G06F 8/67; G06F 8/68; G06F 8/71; G06F 9/4411; G06F 9/44505
USPC ........................................................ 717/174
See application file for complete search history.

(56) References Cited

U.S. PATENT DOCUMENTS

| 8,639,733 | B2 * | 1/2014 | Holden et al. ................. 707/827 |
| 2003/0229723 | A1 | 12/2003 | Kangas et al. |
| 2007/0130626 | A1 * | 6/2007 | Kato et al. ........................ 726/27 |
| 2007/0242061 | A1 | 10/2007 | Rhoten et al. |
| 2009/0051649 | A1 * | 2/2009 | Rondel ............................ 345/156 |
| 2009/0284476 | A1 * | 11/2009 | Bull et al. ....................... 345/173 |
| 2010/0233996 | A1 * | 9/2010 | Herz et al. ..................... 455/411 |
| 2010/0234051 | A1 | 9/2010 | Holden et al. |
| 2010/0235454 | A1 * | 9/2010 | Holden et al. ................. 709/206 |

(Continued)

FOREIGN PATENT DOCUMENTS

| EP | 1564972 A1 * | 8/2005 |
| GB | 2444305 A | 6/2008 |

(Continued)

OTHER PUBLICATIONS

Android Developers/Google (2011). "Accessory Development Kit 2011." Retrieved from http://developer.android.com/tools/adk/adk.html.*

(Continued)

*Primary Examiner* — Qing Chen
*Assistant Examiner* — Andrew M Lyons
(74) *Attorney, Agent, or Firm* — Ditthavong & Steiner, P.C.

(57) ABSTRACT

An approach is presented for making the use of a mobile device more socially suitable. Remote control application programming interfaces and installation packages are specified to developers for designing applications that can be controlled via a main device (e.g., a mobile phone) and one or more accessory devices (e.g., a watch). Specifically, each application is required to have two installable components—one that resides on the main device and one that is automatically installed on an associated remote accessory device. By enabling the seamless installation of these two components, a new paradigm or ecosystem for how applications are to be created and installed is introduced. In this new paradigm, application developers will not only develop the applications, but they will also design and define a way to make their applications remotely controllable and reachable from an accessory device, thus making the associated mobile devices running such applications more socially suitable.

20 Claims, 14 Drawing Sheets

(56) References Cited

U.S. PATENT DOCUMENTS

| | | | |
|---|---|---|---|
| 2010/0306320 A1 | 12/2010 | Leppanen et al. | |
| 2011/0185048 A1 | 7/2011 | Yew et al. | |
| 2011/0205851 A1 | 8/2011 | Harris | |
| 2011/0219234 A1 | 9/2011 | Bogner | |
| 2011/0223968 A1* | 9/2011 | Bunk et al. | 455/556.1 |
| 2012/0054634 A1 | 3/2012 | Stone et al. | |
| 2012/0081207 A1 | 4/2012 | Toprani et al. | |
| 2012/0124568 A1* | 5/2012 | Fallon et al. | 717/169 |

FOREIGN PATENT DOCUMENTS

| | | |
|---|---|---|
| WO | 2007035918 A2 | 3/2007 |
| WO | 2008025058 A1 | 3/2008 |

OTHER PUBLICATIONS

Dial2Do, "Dial2Do and the JawBone Icon: one touch access to the Dial2Do Hansfree Assistant!," Jan. 18, 2010, last retrieved from https://dial2do.wordpress.com/category/cool/ on Nov. 15, 2014.*

Nickinson, Phil, "Review: Jawbone Icon Bluetooth headset," Windows Central, Mar. 2, 2010, last retrieved from http://www.windowscentral.com/review-jawbone-icon-bluetooth-headset on Nov. 15, 2014.*

Sony Ericsson Mbw-150 Bluetooth Watches, pp. 1-2, http://www.knowledgebase-script.com/demo/export.php?ID?352&type?PDF.

Creating LiveView plug-ins for Android phones, Nov. 2010, Sony Ericsson, http://developer.sonyericsson.com/wportal/devworld/search2?cc=gb&lc=en#liveview, pp. 1-31.

Notifications API, 2010, Nokia Corporation, pp. 1-13.

Notification of Transmittal of the International Search Report and the Written Opinion of the International Searching Authority, or the Declaration; International Search Report; Written Opinion; for International Application No. PCT/FI2012/051038, dated May 2, 2013, pp. 1-16.

Wikipedia, "Windows Deployment Services," web page, Version last revised Oct. 4, 2011, retrieved from en.wikipedia.org, pp. 1-2.

Wikipedia, "Windows 8," web page, Version last revised Oct. 29, 2011, retrieved from en.wikipedia.org, pp. 1-6.

Wikipedia, "iTunes Remote," web page, Version last revised Oct. 12, 2011, retrieved from en.wikipedia.org, pp. 1-4.

Wikipedia, "Executable," web page, Version last revised Jul. 17, 2011, retrieved from en.wikipedia.org, pp. 1-2.

* cited by examiner

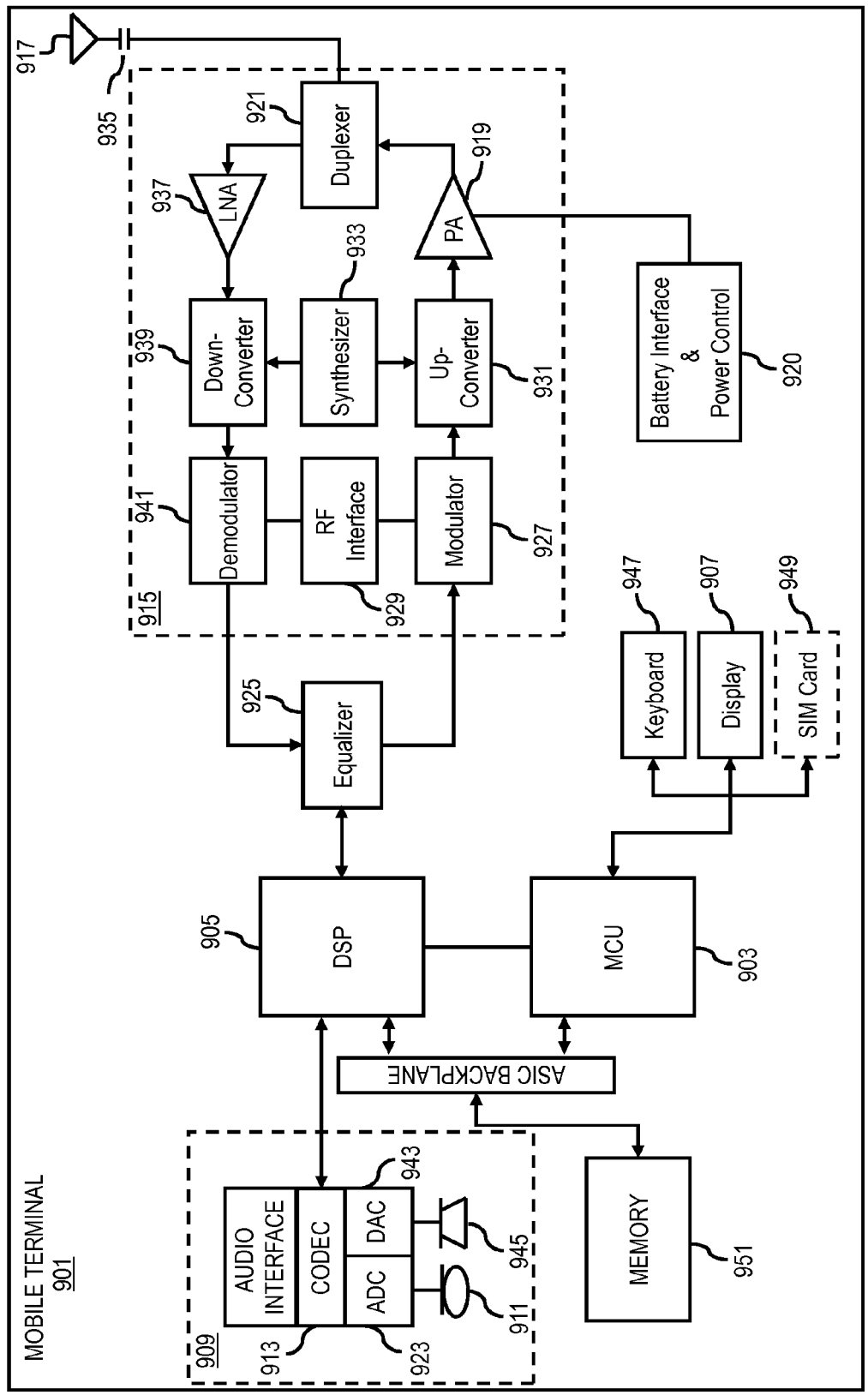

METHOD AND APPARATUS FOR DEVELOPING SOCIALLY SUITABLE APPLICATIONS AND DEVICES

BACKGROUND

Service providers and device manufacturers (e.g., wireless, cellular, etc.) are continually challenged to deliver value and convenience to consumers by, for example, providing compelling network services such as mobile communication services (e.g., email, short message service (SMS), etc.), real-time applications (e.g., sports, stocks, weather, etc.), social networking features (e.g., FACEBOOK, TWITTER, etc.), and the like. Unfortunately, the increasing popularity of such compelling network services can also increase a mobile device (e.g., mobile phone) user's attachment to his or her mobile device, which then often leads to various forms of social disruption. Other companies have previously attempted to address this problem by pairing a mobile phone with a watch that was able to remotely control the mobile phone. However, in most cases, the watch was designed only for certain pre-programmed actions and in the cases where it was possible to create additional pre-programmed actions, there was no tight integration between the applications on the mobile phone and the options on the watch.

SOME EXAMPLE EMBODIMENTS

Therefore, there is a need for an approach for making the use of a mobile device more socially suitable.

According to one embodiment, a method comprises causing, at least in part, a specification of one or more programming interfaces for enabling control of one or more applications via a main device and one or more accessory devices. The method also comprises causing, at least in part, a generation of one or more installation packages for the one or more applications for installation at the main device and the one or more accessory devices.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a specification of one or more programming interfaces for enabling control of one or more applications via a main device and one or more accessory devices. The apparatus is also caused to, at least in part, generate one or more installation packages for the one or more applications for installation at the main device and the one or more accessory devices.

According to another embodiment, a computer-readable storage medium carries one or more sequences of one or more instructions which, when executed by one or more processors, cause, at least in part, an apparatus to cause, at least in part, a specification of one or more programming interfaces for enabling control of one or more applications via a main device and one or more accessory devices. The apparatus also causes, at least in part, a generation of one or more installation packages for the one or more applications for installation at the main device and the one or more accessory devices.

According to another embodiment, an apparatus comprises means for causing, at least in part, a specification of one or more programming interfaces for enabling control of one or more applications via a main device and one or more accessory devices. The apparatus also comprises means for causing, at least in part, a generation of one or more installation packages for the one or more applications for installation at the main device and the one or more accessory devices.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 9 is a diagram of a mobile terminal (e.g., handset) that can be used to implement an embodiment of the invention.

DESCRIPTION OF SOME EMBODIMENTS

Examples of a method, apparatus, and computer program for making the use of a mobile device more socially suitable are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
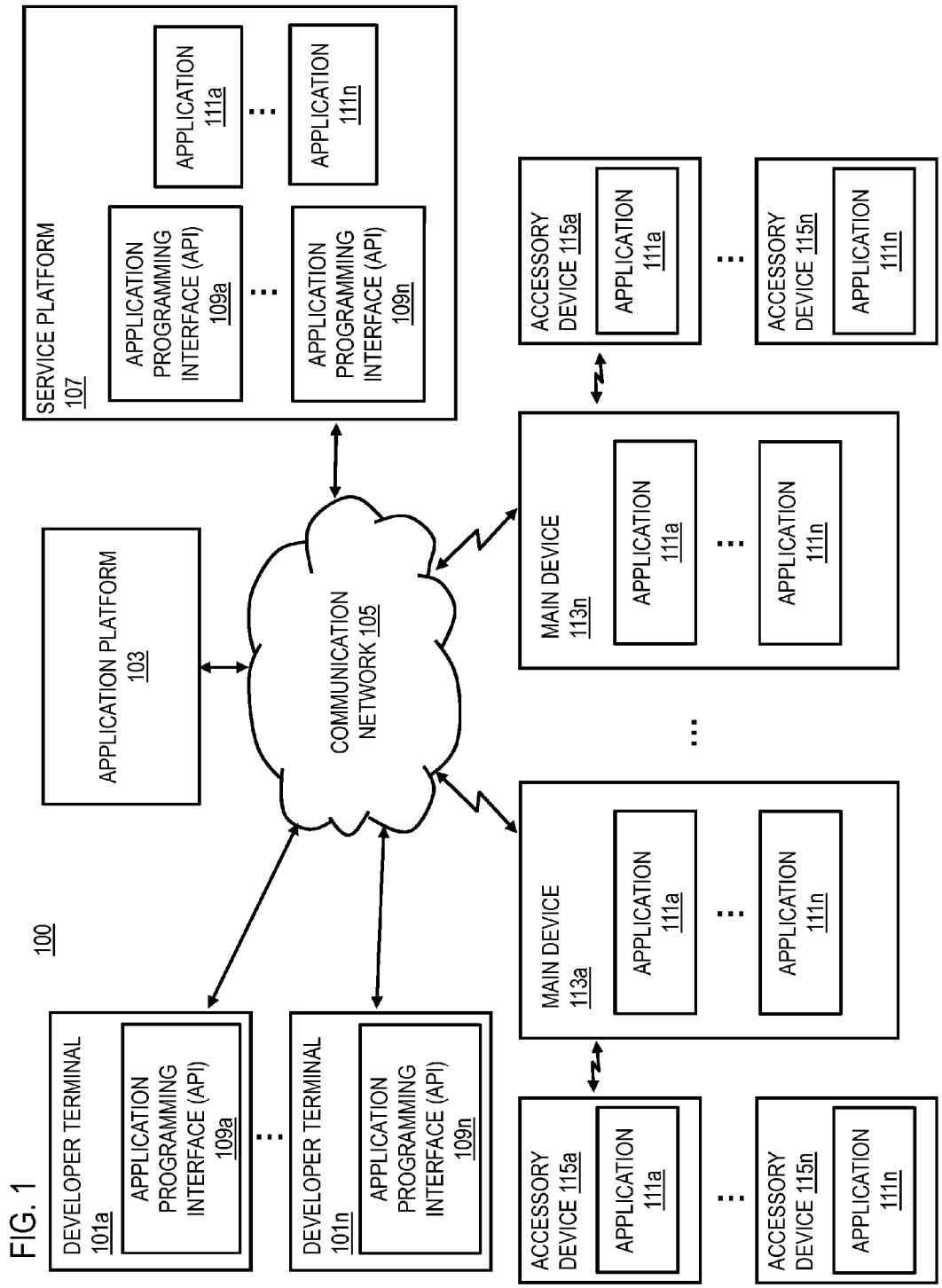
FIG. 1 is a diagram of a system capable of making the use of a mobile device more socially suitable, according to one embodiment.

FIG. 1 is a diagram of a system capable of making the use of a mobile device more socially suitable, according to one embodiment. As previously discussed, service providers and device manufacturers are increasingly providing compelling network services such as mobile communication services (e.g., email, SMS, etc.), real-time applications (e.g., sports, stocks, weather, etc.), social networking features (e.g., FACEBOOK, TWITTER, etc.), and the like available to mobile device users. Unfortunately, the increasing popularity of such compelling network services can also increase a mobile device (e.g., mobile phone) user's attachment to his or her mobile device, which then often leads to various forms of social disruption. For example, women often carry their mobile devices (e.g., a mobile phone) in their handbags while men similarly carry their mobile devices in their pockets. Moreover, most people usually want to know who is calling before they decide to answer their mobile phone. As a result, there is often a delay between answering the call and/or silencing the ringer on the mobile phone. This delay can often cause disruptions in a social setting. A similar disruption can also occur in social gatherings or meetings when mobile phone users forget to turn their mobile phones to silent mode during the gathering or meeting. In addition, a mobile device user's constant looking at his or her mobile device can also cause a disruption by creating a drift in interaction between users and non-users of mobile devices in a social setting (e.g., a bar or elevator).

To address this problem, a system 100 of FIG. 1 introduces the capability of making the use of a mobile device more socially suitable. In one embodiment, the system 100 specifies to developers one or more remote application programming interfaces (APIs) for enabling control of one or more applications via a main device and one or more accessory devices. In addition, the system 100 causes a generation of one or more installation packages for the one or more applications for installation at the main device and the one or more accessory devices. In one example, both the APIs and the one or more installation packages may be contained in a software development kit (SDK). The specification of the one or more APIs and the generation of the one or more installation packages enables developers to design applications that enable a mobile device user to control the one or more applications via a main device (e.g., a mobile phone) and one or more accessory devices (e.g., a watch). Essentially, by exposing the specific APIs and installation packages to developers, the system 100 introduces and promotes a new paradigm or ecosystem for how applications are to be created and installed. In this new paradigm, application developers will not only develop the applications, but they will also design and define a way to make applications controlled remotely from one or more accessory devices thereby reducing the amount of time it takes a mobile device user to answer an incoming call or the amount of time a mobile device user stares at his or her mobile device. In each case, the system 100 enables mobile devices running such applications to be more socially suitable.

In addition to making a mobile device more socially suitable, the system 100 can also improve the usability of a mobile device. For example, while running or biking, it is often difficult for a runner or biker to use his or her mobile device to control the mobile device's integrated music player because the mobile device is often hard to reach during physical activity. Again, by exposing remote control APIs and installation packages to developers to design applications that enable a mobile device user to control the one or more applications via a main device and one or more accessory devices, the system 100 can also improve the usability of many mobiles devices.

As shown in FIG. 1, the system 100 comprises one or more developer terminals 101a-101n (also collectively referred to as developer terminals 101) having connectivity to an application platform 103 via a communication network 105. The application platform 103 may exist in whole or in part within a service platform 107 (e.g., an application store), or independently. The one or more developer terminals 101 may also have connectivity to the service platform 107 via the communication network 105. In one embodiment, the service platform 107 contains one or more remote application programming interfaces (APIs) 109a-109n (also collectively referred to as APIs 109), which are specified by the application platform 103 for enabling control of one or more applications 111a-111n (also collectively referred to as applications 111) on one or more main devices 113a-113n (e.g., a mobile phone) (also collectively referred to as main devices 113) and one or more accessory devices 115a-115n (e.g., a watch or another similar accessory that is small in size) (also collectively referred to as accessory devices 115).

In one embodiment, the application platform 103 also causes, at least in part, the generation of one or more software installation packages (not shown for illustrative purposes) which also may be contained within the service platform 107. For example, the application platform 103 causes, at least in part, the generation of the one or more software installation packages for one or more main devices 113 based, at least in part, on a main device 113 operating system and causes, at least in part, the generation of one or more software installation packages for one or more accessory devices 115 based, at least in part, on an accessory device 115 operating system. In one embodiment, the application platform 103 determines to package the one or more installation packages for the one or more main devices 113, the one or more installation packages for the one or more accessory devices 115, or a combination thereof into a combined installation package, wherein an installation of the combined package causes, at least in part, an initiation of respective installations of the one or more installation packages at the main devices 113, the accessory devices 115, or a combination thereof. For example, the application platform 103 may determine to combine one or more installation packages into a combined installation package based on a particular request from one or more developer terminals 101, the type of network connection available between the one or more developer terminals 101 and the application platform 103, the size of the one or more installation packages, etc.

In one embodiment, the application platform 103 determines a request from one or more developer terminals 101 for APIs 109 and one or more software packages. The application platform 103 then specifies the APIs 109 and the one or more software packages to enable the design of one or more applications 111 for installation at one or more main devices 113 and one or more accessory devices 115. In one example, the application platform 103 determines that the applications 111 are located within the service platform 107 prior to installation at the main devices 113 and the accessory devices 115. In another example, the application platform 103 may specify that the developer terminals 111 cause the applications 111 to be directly installed at the main devices 113 and the accessory devices 115 via the communication network 105.

In one embodiment, when an end-user downloads one or more applications 111 from the service platform 107, the applications 111 already contain two installable components—one that will reside on one or more main devices 113 and one that will be automatically installed on one or more associated accessory devices 115. As previously discussed, the system 100 introduces a new paradigm for how applications such as applications 111 are created and installed. In this new paradigm, all application developers using one or more developer terminals 101, the application platform 103, APIs 109, and one or more software installation packages will not only develop applications 111, but the applications 111 will be remotely controllable and reachable from one or more main devices 113 via one or more associated accessory devices 115. As a result, the one or more accessory devices 115 can enable the remote control of one or more applications 111 on both the one or more accessory devices 115 and the one or more associated main devices 113.

In one embodiment, one or more main devices 113 and one or more associated accessory devices 115 have different form factors. For example, a main device 113 may have a form factor of a mobile phone or a mobile tablet and an associated accessory device 115 may have a form factor of a watch or a writing instrument. In one embodiment, it is also contemplated that one or more accessory devices 115 may also have connectivity to the service platform 107 via the communication network 105.

In one embodiment, by specifying the APIs 109, the application platform 103 causes, at least in part, a rendering of at least one user interface at one or more accessory devices 115, wherein at least one user interface includes one or more user interface elements for enabling the control of one or more applications 111. For example, a simple menu button can allow an end-user to move from one application 111 to another. In the event a notification from one or more applications 111 arrives at an accessory device 115, the application 111 will show-up on the at least one user interface automatically in order to allow the end-user to respond to the notification immediately. In another example, when an incoming call arrives, the end-user can immediately see the caller's name and either select the "silent" or "loudspeaker" controls on the accessory device 115 rather than having to reach for the main device 113 in a handbag or pocket. Also, when walking around, the end-user can see one or more applications 111 (e.g., a map) on one or more accessory devices 115 to know where to go without having to continually look at one or more main devices 113.

In one embodiment, the at least one user interface, the one or more user interface elements, or a combination thereof operate as one or more alternative controls, one or more additional controls, or a combination thereof to at least one other user interface, one or more other user interface elements, or a combination thereof rendered at one or more main devices 113. For example, the interface elements of one or more accessory devices 115 can be used as a remote interface to one or more associated main devices 113 for previewing various notifications (e.g., emails, SMS, incoming caller details, tasks, etc.) and controlling simple actions associated with the main devices 113 (e.g., selecting silence mode, selecting the next song or page, etc.). In one instance, one or more applications 111 may control the ringer function on one or more main devices 113 so that if an end-user is in a social setting and the main device 113 rings, the end-user can use one or more associated accessory devices 115 to answer the call or silence the main device 113 thereby reducing the delay in silencing the main device 113 and, therefore, making the main device 113 less socially disruptive. It is also contemplated, that at least one or more accessory devices 115 may also control one or more applications 111 installed on more than one main device 113.

In one embodiment, the application platform 103's specification of the APIs 109 to one or more developer terminals 101 determines a basic layout or user interface (UI) for at least one accessory device 115. In one embodiment, multiple layouts could be supported based on at least one accessory device 115, but the layouts must all extend from a minimal layout so that the most wanted features work with all accessory devices 115. The application platform 103's specification of the APIs 109 to one or more developer terminals 101 also determines that the one or more accessory devices 115 will have a ticker feature to allow the presentation of more characters of text to an end-user than would otherwise fit within the width of the UI of the one or more accessory devices 115. In addition, the application platform 103's specification of the APIs 109 causes an application developer to determine whether to allow one or more notification triggers to be set per one or more applications 111 or some other variation. Moreover, the application platform 103's specification of the APIs 109 also causes a developer to determine which actions for which notifications can be set using the one or more user interface controls on the one or more accessory devices 115. Furthermore, the application platform 103's specification of the APIs 109 also determines that the following end-user options will be made available for the one or more accessory devices 115: (1) activate/deactivate remote features; (2) activate/deactivate specific notifications; (3) appear/hide in remote menu; and (4) preview snapshots to enable an end-user to easily decide if a notification must be activated or not for a notification. In summary, the application platform 103 specifies the APIs 109 to developers to determine that, at a minimum, the one or more applications 111 must contain notifications to enable various previews and basic actions; a remote access layout for the one or more accessory devices 115, and timeouts that make the notifications disappear automatically. In addition, the application platform 103's specification of the APIs 109 to developers determines that an end-user has the ability to view and turn on/off notifications (both on a per application basis and globally); that one or more applications 111 can be added to a remote menu so that the applications 111 can be determined on-demand; and that the one or more user interface elements for enabling control of the one or more applications 111 can be used to switch to a menu and/or select one or more applications 111 (e.g., cycling through the one or more applications 111).

In one embodiment, the service platform 107 (e.g., an application store) supports both a presentation and a potential distribution to an end-user of one or more applications 111. As previously discussed, it is also contemplated that the service platform 107 can specify to one or more developer terminals 101 the required APIs 109 and the one or more installation packages (e.g., through an "App Wizard") to design one or more applications 111. In one embodiment, the application platform 103 can specify the APIs 109 so that one or more applications 111 contain metadata. The application platform 103 can later process and/or facilitate a processing of the metadata associated with the one or more applications 111 to enable a presentation of the one or more applications 111 to the end-user by function, developer, purchase price, development date, data usage, user satisfaction rating, etc., as well as compatibility with one or more main devices 113 and/or one or more accessory devices 115.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The at least one developer terminal 101 and at least one main device 113 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that one or more main devices 113 can support any type of interface to the user (such as "wearable" circuitry, etc.) and/or at least one accessory device 115.

By way of example, the at least one developer terminal 101, the application platform 103, the one or more main devices 113, the one or more accessory devices 115, and the service platform 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
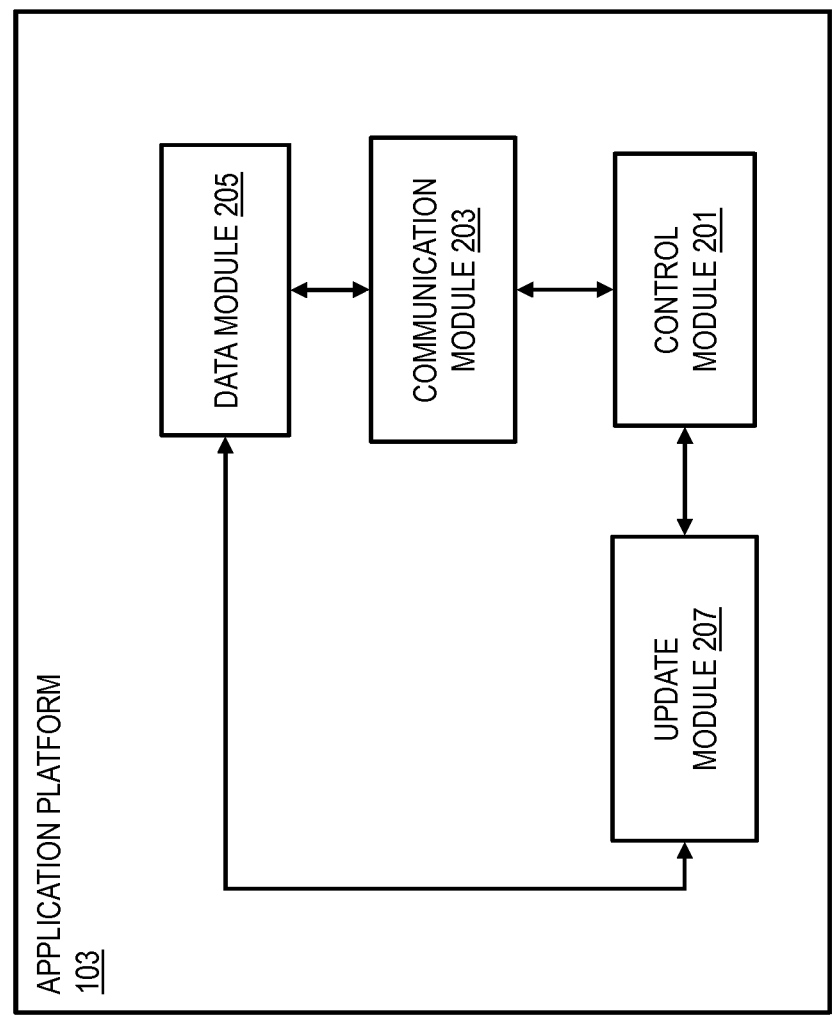
FIG. 2 is a diagram of the components of a developer platform, according to one embodiment.

FIG. 2 is a diagram of the components of an application platform 103, according to one embodiment. By way of example, the application platform 103 includes one or more components for making the use of a mobile device more socially suitable as described in the various embodiments discussed herein. It is contemplated that the functions of these components may be combined in one or more components or performed by other components of equivalent functionality. As noted previously, it is contemplated that all or a portion of the functions of the application platform 103 may be performed by the service platform 107.

In this embodiment, the application platform 103 includes a control module 201, a communication module 203, a data module 205, and an update module 207. The control module 201 oversees tasks, including tasks performed by the communication module 203, the data module 205, and the update module 207. The communication module 203 is used for communication between one or more developer terminals 101, the application platform 103, the service platform 107, and one or more main devices 113. As previously discussed, in one embodiment, the communication module 203 is also used for communication between one or more accessory devices 115 and the service platform 107. The communication module 203 may be further used to cause the loading of one or more APIs 109 (e.g., a Notification Service API) and one or more installation packages into the data module 205. In one embodiment, the control module 201 causes, at least in part, the loading of one or more software components into the data module 205 prior to receiving a request from one or more developer terminals 101. In another example, the control module 201 causes, at least in part, the generation of one or more software components (e.g., from the service platform 107) in real-time upon receiving a request from one or more developer terminals 101. The data module 205 manages the organization and storage of the one or more APIs 109 and the one or more installation packages. The update module 207 may be used to determine updates to the one or more APIs 109, the one or more installation packages, or a combination thereof.

In one embodiment, the control module 201 causes, at least in part, the generation of the one or more installation packages for a main device 113 based, at least in part, on a main device 113 operating system, which comprises in addition to the software codes for the one or more applications 111 the following: (1) a Remote Accessory Manager further comprised of User Preferences, Remote Devices, Network Setup etc.; (2) a Package Manager; and (3) a Notification Manager. In one example, the control module 201, also causes, at least in part, the generation of the one or more installation packages for the one or more accessory devices 115 based, at least in part, on an accessory device 115 operating system, which comprises in addition to the software codes for the one or more applications 111 the following: (1) an Application Manager further comprising User preferences, User Interface (UI) actions, Network preferences etc.; (2) a Package Manager; and (3) a Notification Manager.

In one embodiment, the control module 201 causes, at least in part, the one or more installation packages for the main device 113 and one or more accessory devices 115 to be loaded into the data module 205 as a combined installation package, wherein an installation of the combined installation package causes, at least in part, an initiation of respective installation packages at the main device 113, the one or more accessory devices 115, or a combination thereof. For example, the control module 201 may cause, at least in part, the one or more APIs 109 and the one or more installation packages (combined or separate) to be loaded into the data module 205 as part of a SDK. In one embodiment, the one or more APIs 109 are part of a software development platform including, at least in part, one or more application stores. The specific interaction between the different components contained within the main device 113 operating system and the accessory device 115 operating system for the key uses such as the follow: (1) installing the one or more applications 111; (2) sending notifications associated with the one or more applications 111; and (3) receiving remote actions from the one or more accessory devices 115 are detailed more fully in FIGS. 4A-4D.

Figure 3A:
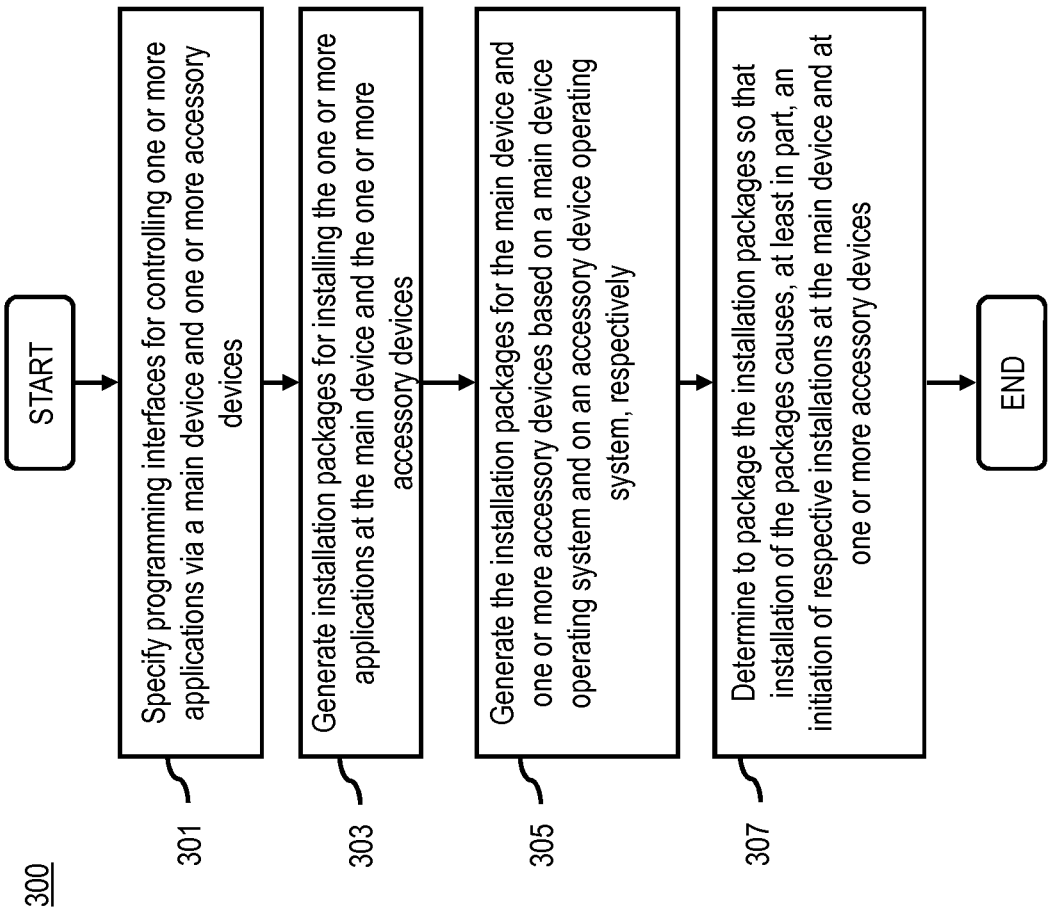
FIGS. 3A-3C are flowcharts of processes for making the use of a mobile device more socially suitable, according to one or more embodiments.
Figure 3B:
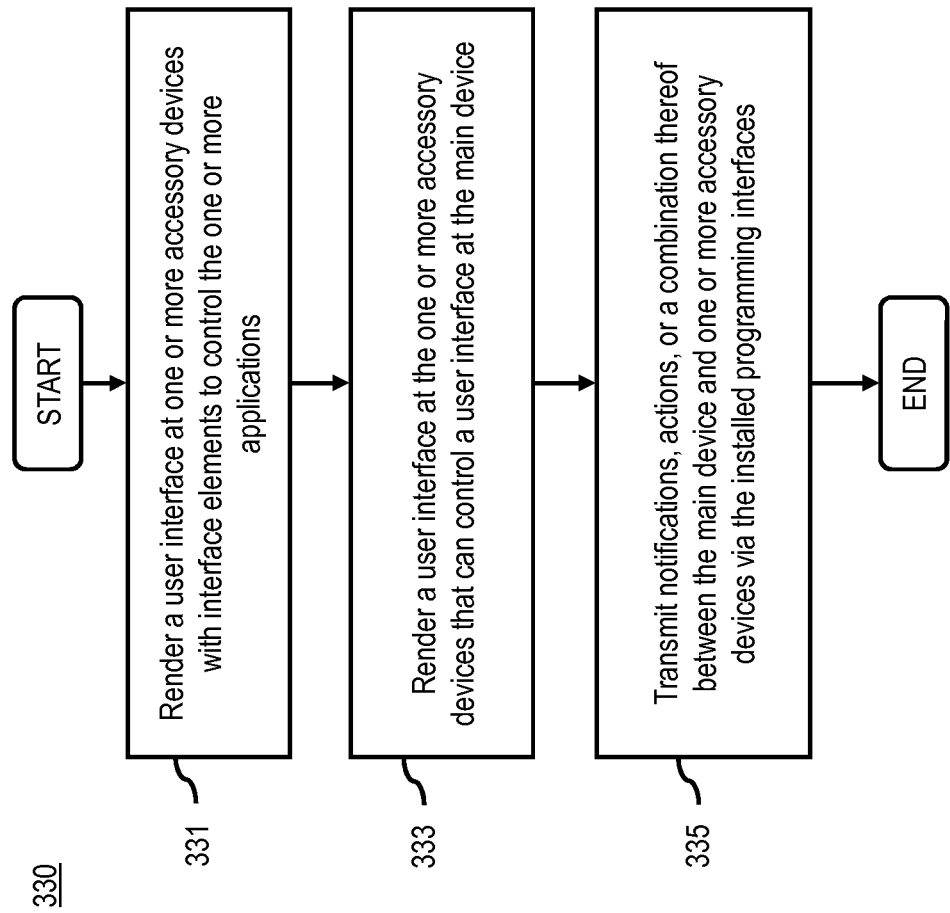
Figure 3C:
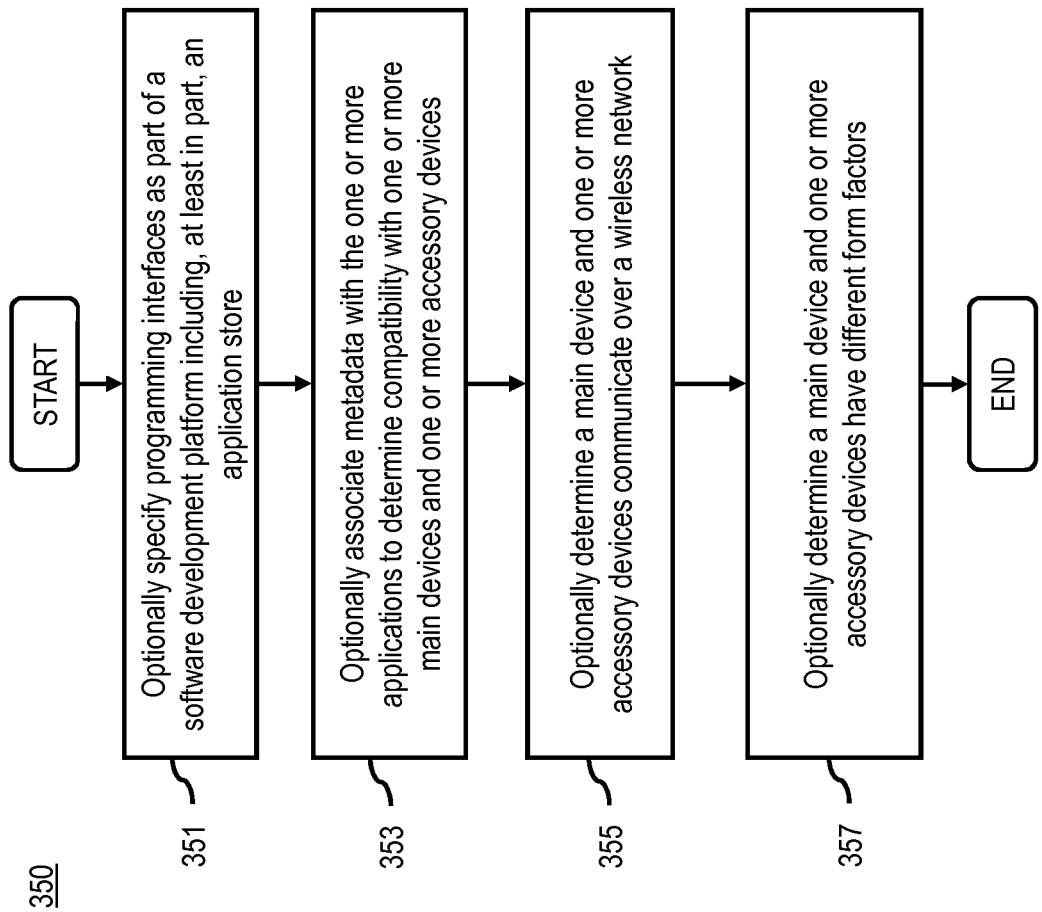
Figure 8:
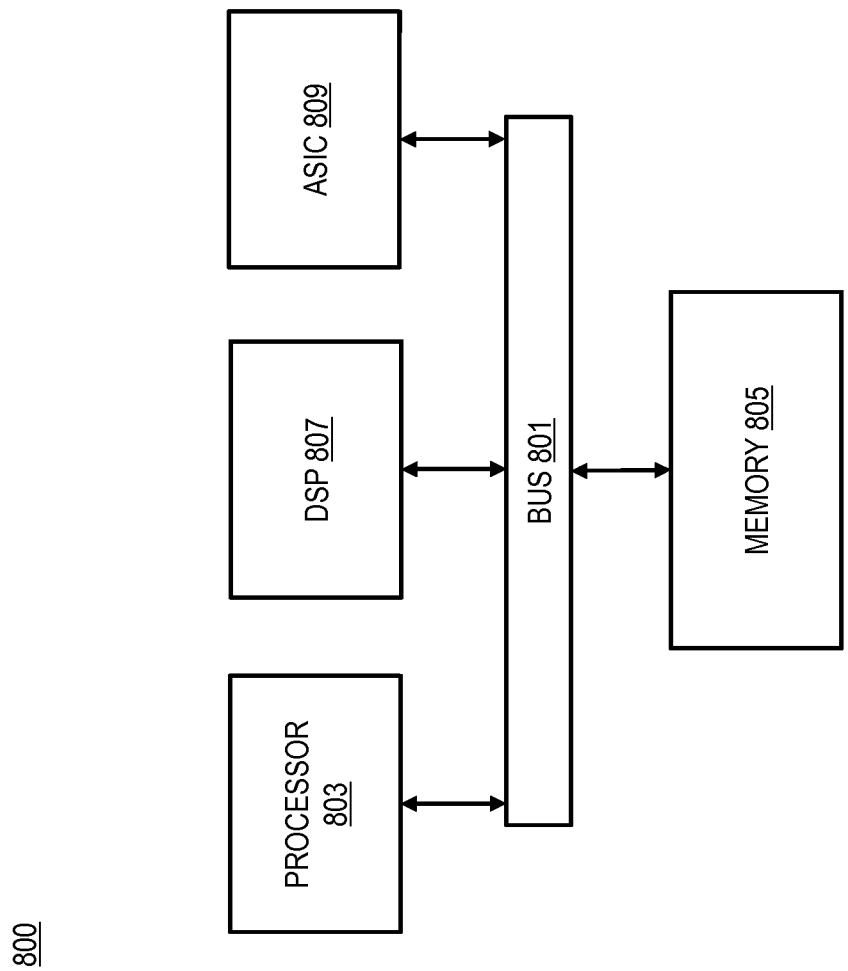
FIG. 8 is a diagram of a chip set that can be used to implement an embodiment of the invention.

FIGS. 3A-3C are flowcharts of processes for making the use of a mobile device more socially suitable, according to one or more embodiments. FIG. 3A depicts a process 300 for causing, at least in part, the specification of the software components required to enable the design and development of one or more applications 111 that can be remotely controlled via one or more main devices 113 and one or more accessory devices 115. In one embodiment, the application platform 103 performs the process 300 and is implemented in, for instance, a chip set including a processor and a memory as shown in FIG. 8. In step 301, the application platform 103 processes and/or facilitates a processing of a request from one or more developer terminals 101 to cause, at least in part, a specification of one or more programming interfaces (e.g., APIs 109) for enabling control of one or more applications 111 via a main device 113 and one or more accessory devices 115. In step 303, the application platform 103 processes and/or facilitates a processing of a request from one or more developer terminals 101 to cause, at least in part, a generation of one or more installation packages for the one or more applications 111 for installation at the main device 113 and the one or more accessory devices 115. In step 305, the application platform 103 causes, at least in part, the generation of one or more installation packages for the main device 113 based on a main device 113 operating system, which includes in addition to the software codes for the one or more applications 111 the following: (1) a Remote Accessory Manager further comprised of User Preferences, Remote Devices, Network Setup etc.; (2) a Package Manager; and (3) a Notification Manager. The application platform 103 also causes, at least in part, the generation of the installation packages for one or more accessory devices 115 based on an accessory device 115 operating system that includes in addition to the software codes for the one or more applications 111 the following: (1) an Application Manager further comprising User preferences, UI actions, Network preferences etc., a Package Manager, and a Notification Manager. In step 307, the application platform 103 determines whether to package the one or more installation packages for the main device 113, the one or more installation packages for one or more accessory devices 115, or a combination thereof into combined installation package wherein, installation of the combined installation package, causes, at least in part, an initiation of respective installations of the one or more installations packages at the main device 113, the one or more accessory devices 115, or a combination thereof. As previously discussed, the application platform 103 may determine to package the one or more installation packages into a combined installation package based on the particular request from one or more developer terminals 101, the type of network connection available between the one or more developer terminal 101s and the application platform 103, the size of the one or more installation packages, etc.

FIG. 3B depicts a process 330 for establishing the remote communication between the one or more applications 111, a main device 113, and one or more one accessory devices 115. In one embodiment, the application platform 103 performs the process 330 and is implemented in, for instance, a chip set including a processor and a memory as shown in FIG. 8. In step 331, the application platform 103 causes, at least in part, a rendering of at least one user interface at the one or more accessory devices 115, wherein the at least one user interface includes one or more interface elements for enabling control of the one or more applications 111. For example, a particular user interface may be rendered as a result of the one or more APIs 109 loaded within the data module 205. In step 333, the application platform 103 causes, at least in part, the rendering of the at least one user interface, the one or more user interface elements, or a combination thereof based on an ability to operate as one or more alternative controls, one or more additional controls, or a combination thereof to at least one other user interface, one or more other user interface elements, or a combination thereof rendered at a main device 113. In step 335, the application platform 103 causes, at least in part, a transmission of one or more notifications, one or more actions, or a combination thereof associated with the one or more applications 111 between the main device 113 and the one or more accessory devices 115 via the one or more programming interfaces (e.g., APIs 109).

Figure 6:
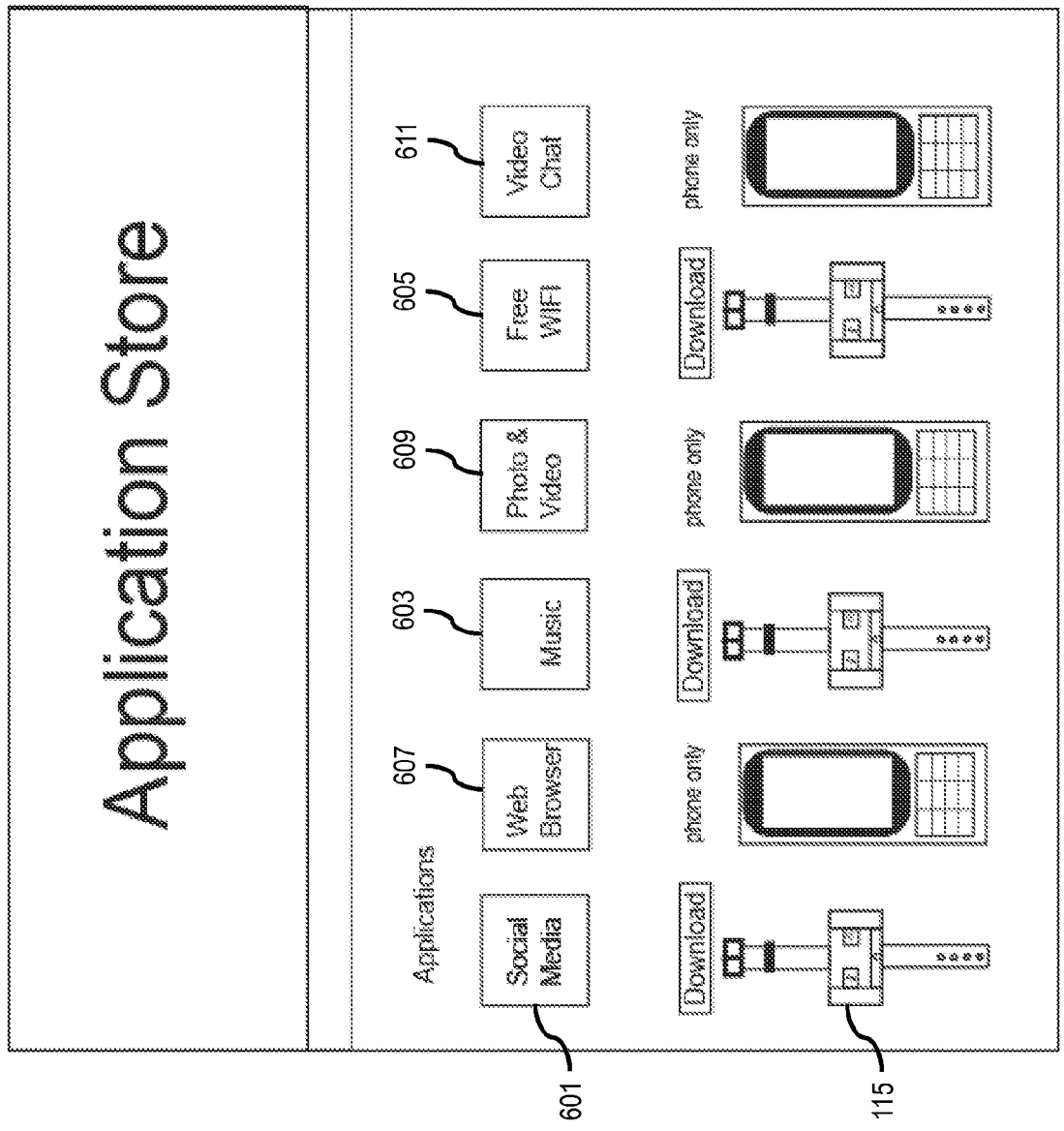
FIG. 6 is a diagram of an example of an application store interface, according to one embodiment.

FIG. 3C shows a process 350 for generating at least one or more additional embodiments of the process 300. In one embodiment, the application platform 103 performs the process 350 and is implemented in, for instance, a chip set including a processor and a memory as shown in FIG. 8. In step 351, the application platform 103, causes, at least in part, a generation one or more programming interfaces (e.g., APIs 109) as part of a software development platform including, at least in part, at least one or more application stores (e.g., the service platform 107). For example, one or more developers could utilize an application wizard commonly available at an application store. In step 353, the application platform 103 causes, at least in part, an association of metadata with the one or more applications 111, wherein the metadata includes, at least in part, compatibility information associated with the main device 113, the one or more accessory devices 115, or a combination thereof. As previously discussed, the metadata can also be associated with one or more applications 111's function, developer, purchase price, development date, data usage, user satisfaction rating, etc. An illustration of this example is shown in FIG. 6. In step 355, the application platform 103 determines that the main device 113 and one or more accessory devices 115 communicate over a wireless network. As a result, the use of one or more applications 111 and the main device 113 can be more socially suitable and usable. In step 357, the main device 113 and one or more accessory devices 115 have different form factors. For example, the main device 113 may have the form factor of a mobile phone or a mobile tablet and the one or more accessory devices 115 may have the form factor of a watch or a writing instrument.

Figure 4A:
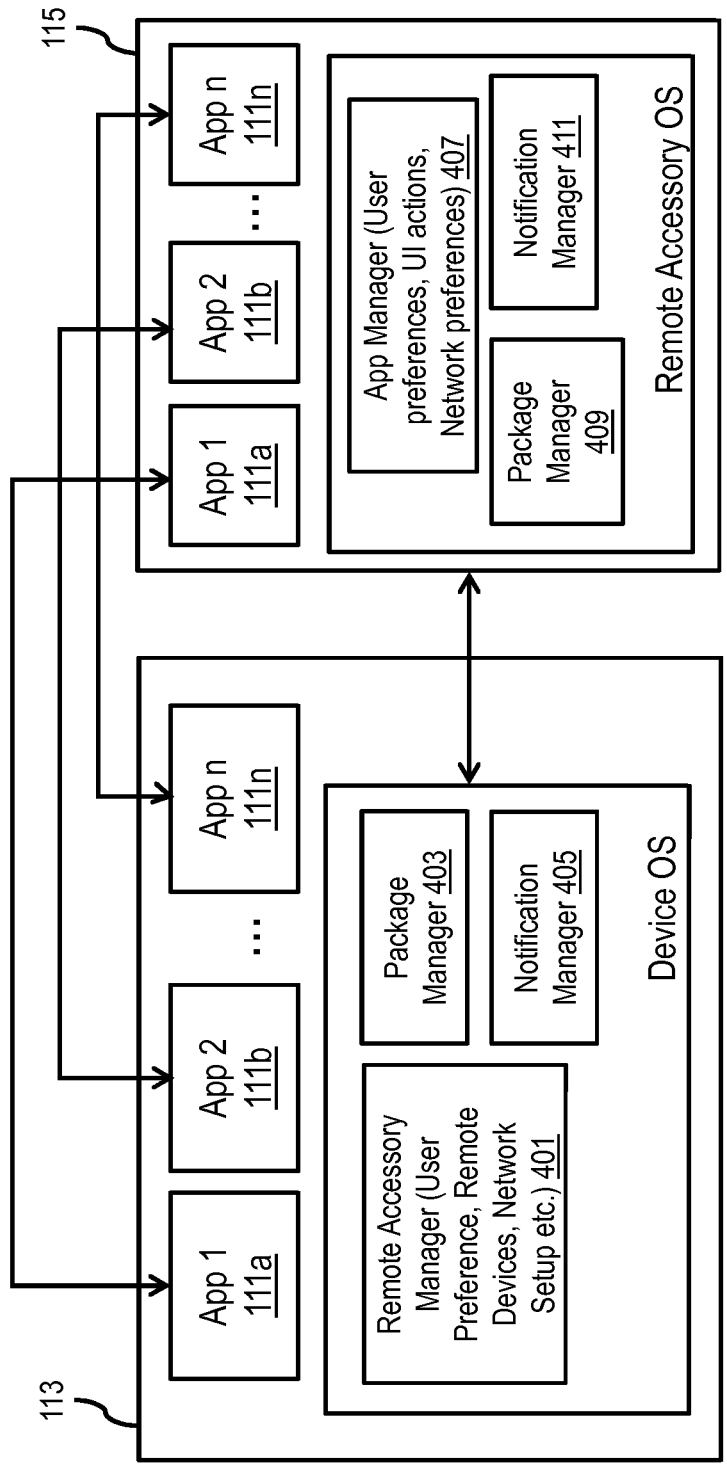
FIGS. 4A-4D are diagrams of the interactions between the software components utilized in the processes of FIGS. 3A-3C, according to one embodiment.

FIGS. 4A-4D are diagrams of the interactions between the software components utilized in the processes of FIGS. 3A-3C, according to one embodiment. FIG. 4A is a diagram of the software components required for enabling control of one or more applications 111 via a main device 113 and one or more accessory devices 115. As previously noted, the application platform 103, upon request from one or more developer terminals 101 causes, at least in part, the generation of the one or more installation packages for a main device 113 based, at least in part, on a main device 113 operating system, which comprises in addition to the software codes for the one or more applications 111 the following: (1) a Remote Accessory Manager 401 further comprised of User Preferences, Remote Devices, Network Setup etc.; (2) a Package Manager 403; and (3) a Notification Manager 405. In one example, the application platform 103, also causes, at least in part, the generation of the one or more installation packages for the one or more accessory devices 115 based, at least in part, on an accessory device 115 operating system, which comprises in addition to the software codes for the one or more applications 111 the following: (1) an Application Manager 407 further comprising User preferences, User Interface (UI) actions, Network preferences etc.; (2) a Package Manager 409; and (3) a Notification Manager 411.

Figure 4B:
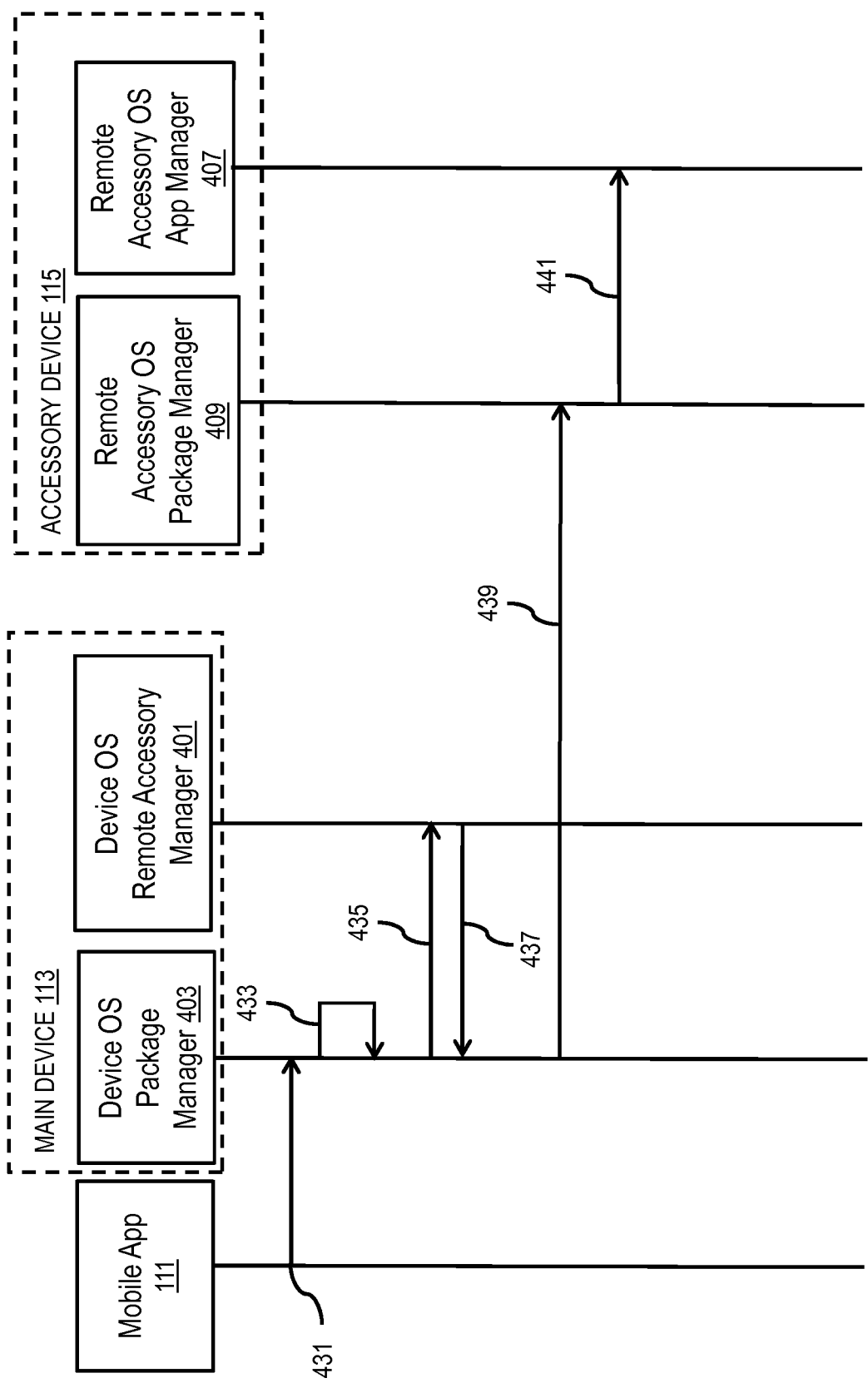

FIG. 4B is a ladder diagram that illustrates a sequence of messages and processes used in installing an application 111 at a main device 113 and one or more accessory devices 115, according to an exemplary embodiment. A network process is represented by a thin vertical line. A step or message passed from one process to another is represented by horizontal arrows. In step 431, the one or more applications 111 are acquired by an end-user (e.g., from the service platform 107). In step 433, the application platform 103 causes, at least in part, the installation of one or more applications 111 at the main device 113 by the main device 113 package manager. In step 435, the main device 113 package manager 403 communicates with the main device 113 remote accessory manager 401 to determine whether any user preferences have been set regarding the installation of applications. Step 435 by the main device 113 package manager 403 may include prompting the end-user if such preferences have not already been determined by the main device 113 remote accessory manager. In step 437, the end-user's preferences, if any, are determined. In step 439, the main device 113 package manager 403 causes the installation of the one or more installation packages at one or more accessory device 115 package managers 409. In step 441, the one or more accessory device 115 package managers 409 cause, at least in part, a presentation to the end-user of the one or more installed applications 111 through the one or more accessory device 115 application mangers 407 and the at least one user interface of the one or more accessory devices 115.

Figure 4C:
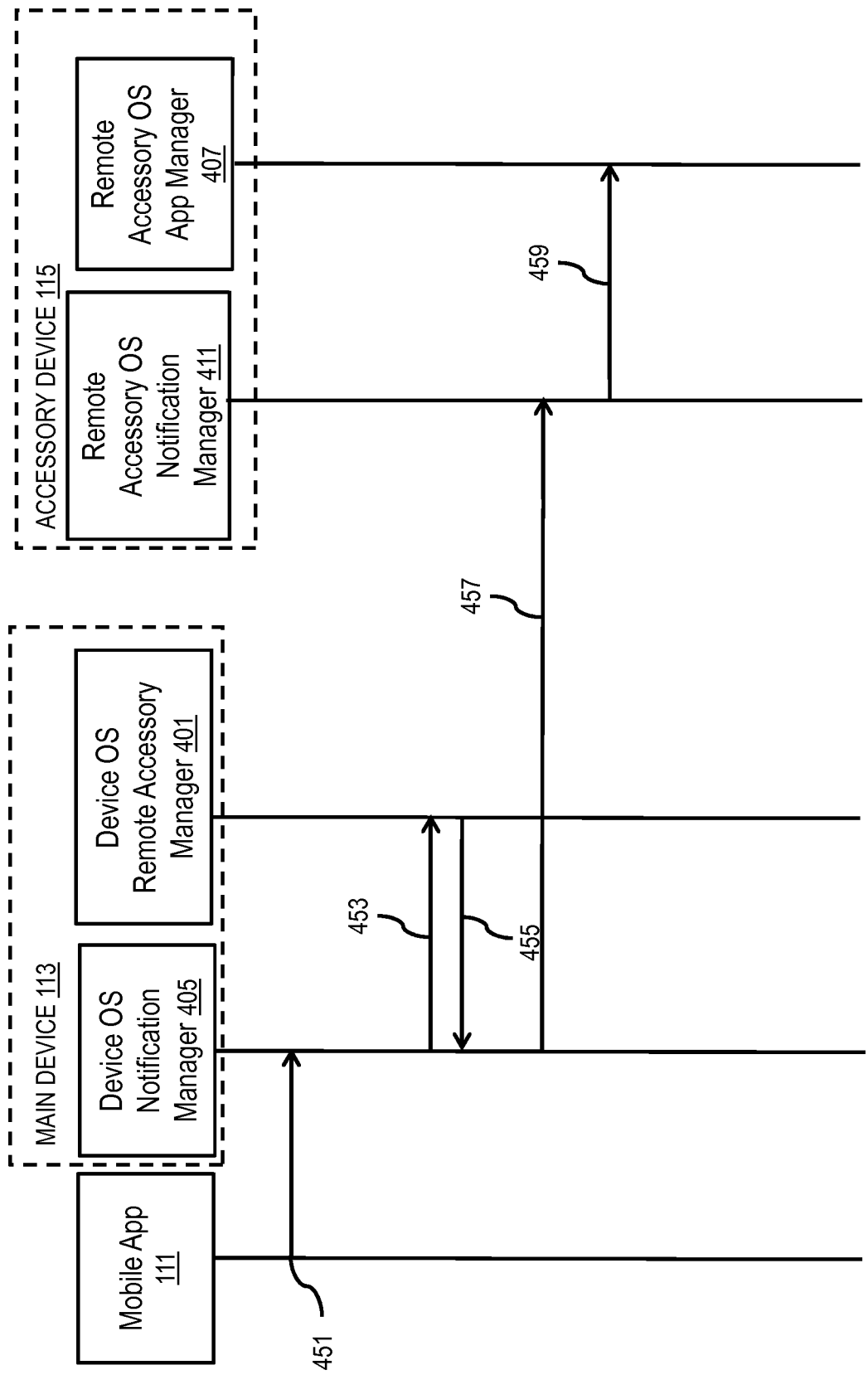

FIG. 4C is a ladder diagram that illustrates a sequence of messages and processes used in sending a notification determined by a main device 113 and one or more accessory devices 115. In step 451, the application platform 103 causes, at least in part, one or more applications 111 to notify the main device 113 notification manager 405 that a notification (e.g., an incoming call from John Smith) has arrived from the one or more applications 111. In step 453, the main device 113 notification manager 405 communicates with the main device 113 remote accessory manager 401 to determine whether any user preferences exist regarding the presentation of notifications. In step 455, the end-user's preferences, if any, are determined by the main device 113 notification manager 405. In step 457, the main device 113 notification manager 405 sends the notification from the main device 113 notification manager 405 to one or more the accessory device 115 notification managers 411. In step 459, the one or more accessory device 115 notification managers 411 cause a presentation to the end-user of the notification through the one or more accessory device 115 application mangers 407 and the at least one user interface of the one or more accessory devices 115.

Figure 4D:
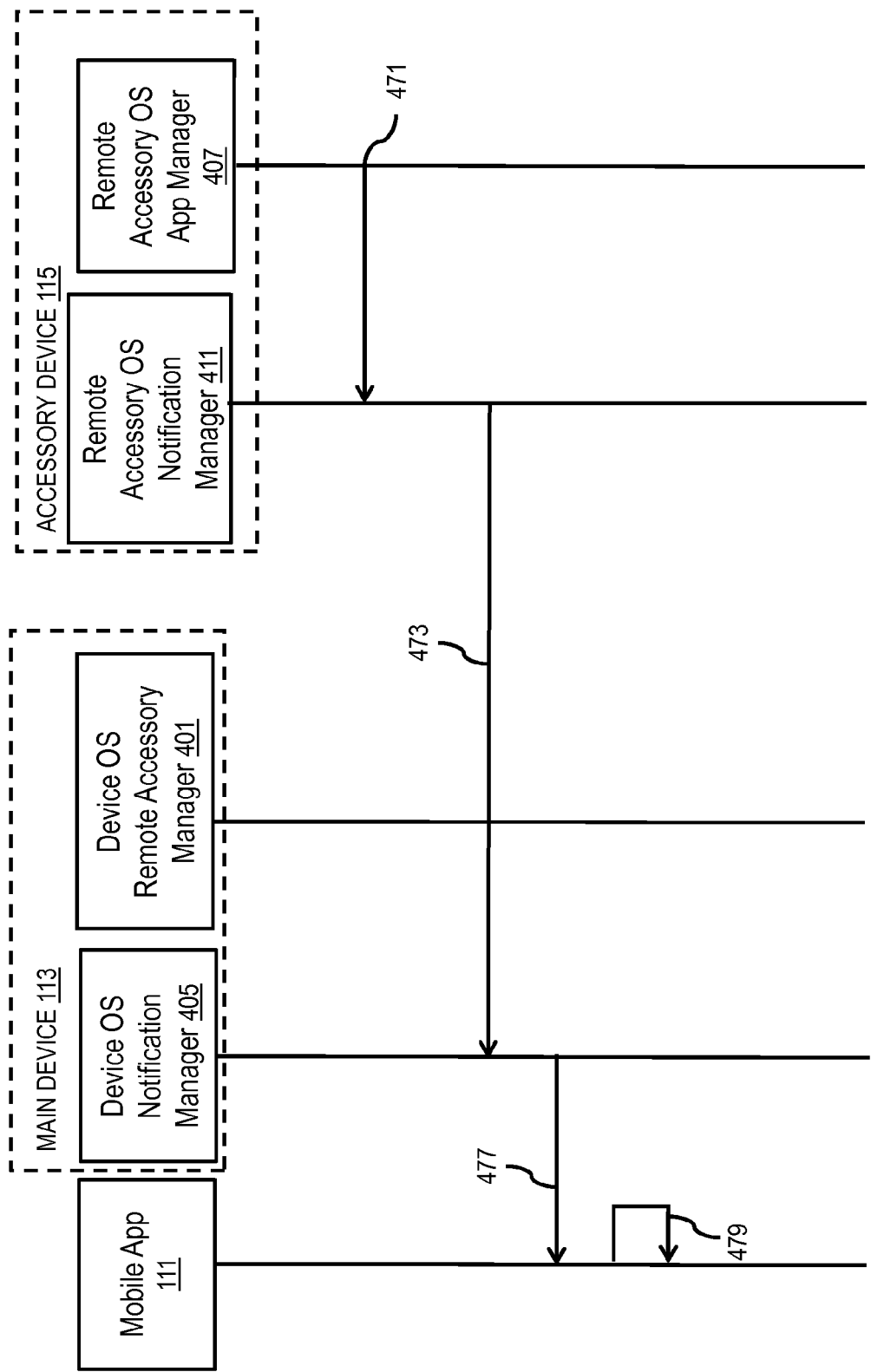

FIG. 4D is a ladder diagram that illustrates a sequence of messages and processes used in receiving a remote action from one or more accessory devices 115. In one embodiment, after the end-user receives a notification (e.g., an incoming call from John Smith) from one or more applications 111, the end-user can select to silence the notification both at the one or more accessory devices 115 and the main device 113. For example, in step 471, the one or more accessory device 115 application managers 407 register the end-user's selection and then communicate the end-user's action to the one or more accessory device 115 notification managers. In step 473, the one or more accessory device 115 notification managers 411 transmit the end-user's selected action to the main device 113 notification manager 405. In step 477, the main device 113 notification manager 405 sends the selected action to the one or more installed applications 111 for implementation in step 479. In this instance, the delay typically associated with determining actions relative to a mobile device (e.g., silencing an incoming call from John Smith) is reduced through the implementation of one or more accessory devices 115, which in turn enables the main device 113 to be less socially disruptive.

Figure 5:
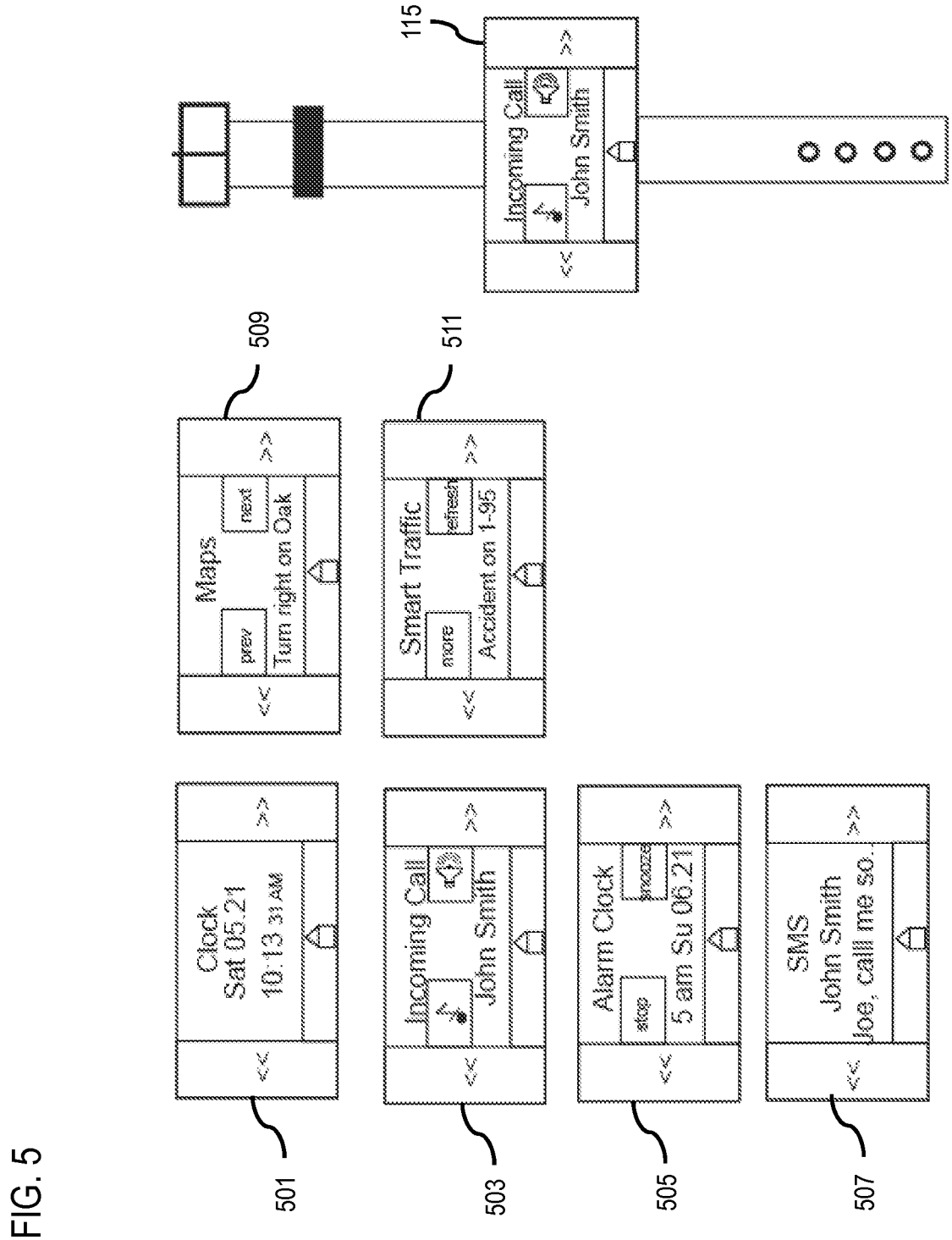
FIG. 5 is a diagram of an example of an accessory device utilized in the processes of FIGS. 3A-3C, according to one embodiment.

FIG. 5 is a diagram of an example of an accessory device 115 and at least one user interface utilized in the processes of FIGS. 3A-3C, according to one embodiment. Specifically, FIG. 5 depicts how various applications 111 installed at a main device 113 and an accessory device 115 would appear to an end-user. In this instance, the specification by a developer of a simple menu button can allow the end-user to easily navigate from one application 111 to another (e.g., time 501, phone 503, alarm 505, messaging 507, maps 509, and smart traffic 511). In the event that a notification from one or more applications 111 arrives (e.g., an incoming call from John Smith) at the accessory device 115, the notification automatically appears on the at least one user interface to enable the end-user to see the caller's name and either select "silent" or "loudspeaker" from the at least one user interface. As previously noted, the implementation of one or more accessory devices 115 can reduce the delay that is often associated with an end-user having to first find a main device 113 in a handbag or pocket, which in turn reduces the potential for social disruption caused by the main device 113. Likewise, when walking around, for example, an end-user is able to see map directions by just looking at the accessory device 115, which in turn improves the usability a main device 113.

FIG. 6 is a diagram of an example of an application store 600 located within the service platform 107, in one embodiment. As previously noted, the applications platform 103 may specify the APIs 109 so that one or more applications 111 contain metadata. Later, the application platform 103 may process and/or facilitate a processing of the metadata associated with the one or more applications 111. The metadata associated with each application 111 can later be processed by the application platform 103 to enable the presentation to an end-user of the one or more applications 111 based on function, developer, purchase price, development date, data usage, user satisfaction rating, etc., as well as compatibility with one or more main devices 113 and/or one or more accessory devices 115. In this instance, an application 111's compatibility with one or more main devices 113 and/or one or more accessory devices 115 is depicted. For example, an application platform 103 is able to determine based on the metadata associated with the applications 111 intended for messaging 601, music 603, and WIFI 605 that one or more accessory devices 115 is compatible with such applications 111 and therefore these applications 111 are available for downloading to one or more accessory devices 115. In contrast, given the specification that one or more accessory devices 115 are to be small in size, the application platform 103 can determine based on the metadata associated with the applications 111 intended for internet 607 and/or picture browsing 609 or video conferencing 611 that such applications 111 are not compatible with any accessory devices 115 and therefore these applications 111 are not available for downloading to one or more accessory devices 115.

The processes described herein for making the use of a mobile device more socially suitable may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
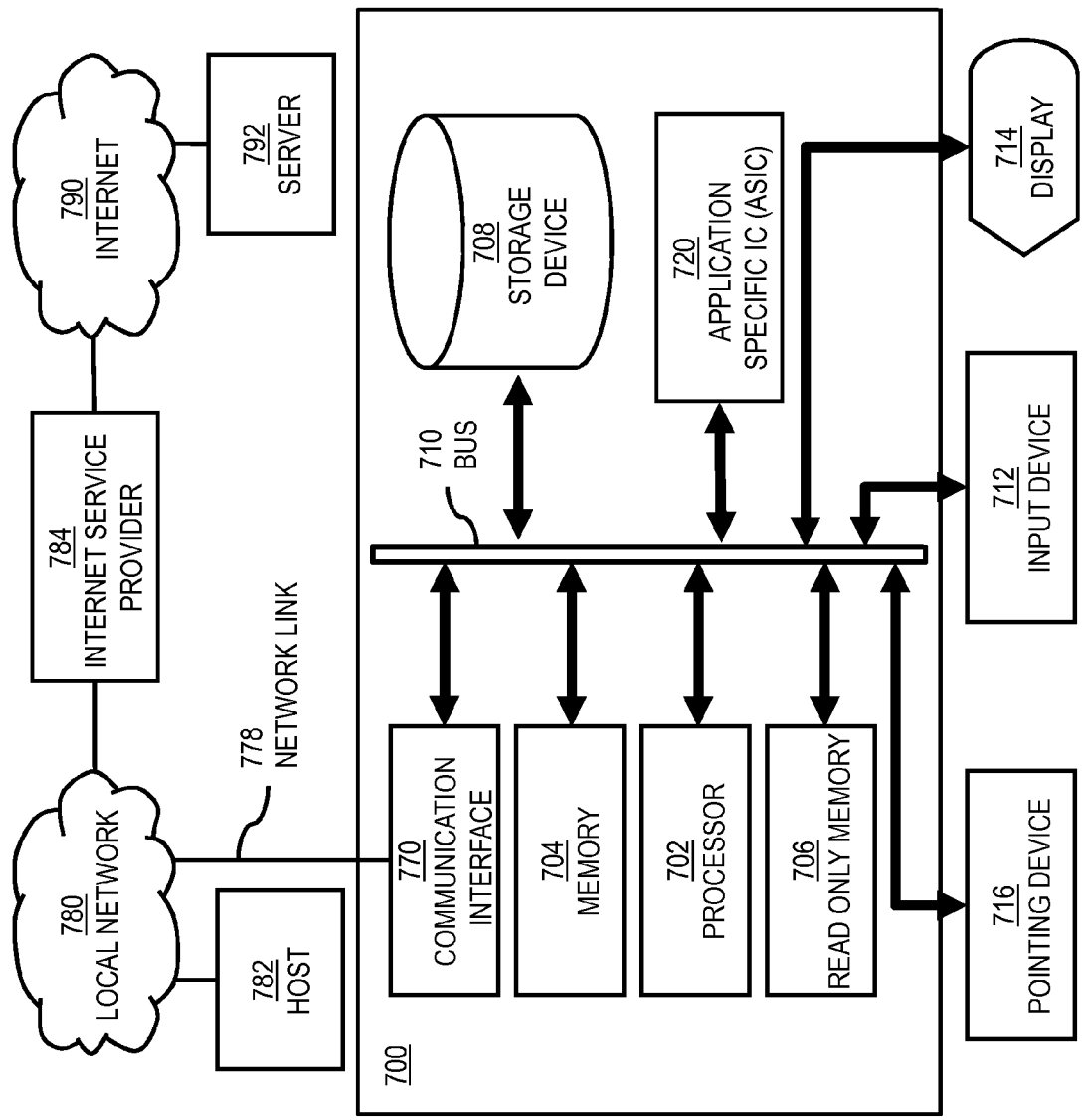
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to make the use of a mobile device more socially suitable as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of making the use of a mobile device more socially suitable.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to making the use of a mobile device more socially suitable. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for making the use of a mobile device more socially suitable. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for making the use of a mobile device more socially suitable, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for making the use of a mobile device more socially suitable to the developer terminal 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to make the use of a mobile device more socially suitable as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of making the use of a mobile device more socially suitable.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to make the use of a mobile device more socially suitable. The memory 805 also stores the data associated with or generated by the execution of the inventive steps.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of making the use of a mobile device more socially suitable. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of making the use of a mobile device more socially suitable. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to make the use of a mobile device more socially suitable. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising facilitating a processing of and/or processing (1) data and/or (2) information and/or (3) at least one signal, the (1) data and/or (2) information and/or (3) at least one signal based, at least in part, on the following:
a specification of one or more programming interfaces for enabling control of one or more applications via a main mobile device and one or more accessory mobile devices;
a generation of one or more installation packages for the one or more applications for installation at the main mobile device and for installation at the one or more accessory mobile devices; and
a rendering of at least one user interface at the one or more accessory mobile devices,
wherein the at least one user interface includes one or more user interface elements graphically depicting that at least one of the applications and the main mobile device are compatible, but that the at least one of the applications and at least one of the accessory mobile devices are not compatible.

2. A method of claim 1,
wherein the compatibility is determined based, at least in part, on one or more form factors of the at least one of the accessory mobile devices,
the generation of the one or more installation packages for the main mobile device is based, at least in part, on a main mobile device operating system and one or more form factors relating to compatibility between at least one of the applications and the main mobile device; and
the generation of the one or more installation packages for the at least one accessory mobile device is based, at least in part, on an accessory mobile devices operating system and the compatibility.

3. A method of claim 1, wherein the (1) data and/or (2) information and/or (3) at least one signal are further based, at least in part, on the following:
a determination to package the one or more installation packages into a combined installation package,
wherein the one or more installation packages comprise at least one installation package for installation at the main mobile device and at least one other installation package for installation at the one or more accessory mobile devices, a portion of the one or more applications is installed or rendered on the main mobile device and on the one or more accessory mobile devices, and
wherein an installation of the combined installation package causes, at least in part, an initiation of respective installations of the one or more installation packages at the main mobile device, the one or more accessory mobile devices, or a combination thereof.

4. A method of claim 2, wherein the (1) data and/or (2) information and/or (3) at least one signal are further based, at least in part, on the following:
a recommendation of the one or more applications to be downloaded to the one or more accessory mobile devices based, at least in part, on the one or more form factors of the at least one of the accessory mobile devices,
wherein the at least one user interface includes one or more other user interface elements for enabling control of the one or more applications active on the main mobile device.

5. A method of claim 4, wherein the at least one user interface, the one or more user interface elements, or a combination thereof operate as one or more alternative controls, one or more additional controls, or a combination thereof to at least one other user interface, one or more other user interface elements, or a combination thereof rendered at the main mobile device.

6. A method of claim 1, wherein the (1) data and/or (2) information and/or (3) at least one signal are further based, at least in part, on the following:
a transmission of one or more notifications, one or more actions, or a combination thereof associated with the one or more applications between the main mobile device and the one or more accessory mobile devices via the one or more programming interfaces.

7. A method of claim 1, wherein the one or more programming interfaces are part of a software development platform including, at least in part, one or more application stores, and
the user interface elements include a graphic of the at least one of the accessory mobile devices and an indication that at least another one of the applications as compatible with the at least one of the accessory mobile devices and the main mobile device.

8. A method of claim 4, wherein the (1) data and/or (2) information and/or (3) at least one signal are further based, at least in part, on the following:
an association of metadata with the one or more applications,
wherein the metadata data includes, at least in part, compatibility information associated with the main mobile device, the one or more accessory mobile devices, or a combination thereof, that includes the one or more form factors relating to compatibility with the at least one of the accessory mobile devices.

9. A method of claim 7, wherein the main mobile device and the one or more accessory mobile devices communicate over a wireless network including wireless fidelity, a wireless local area network, Bluetooth, or a combination thereof, and
the indication depicts the at least one of the applications as downloadable to the at least one of the accessory mobile devices.

10. A method of claim 7, wherein the main mobile device and the one or more accessory mobile devices have different form factors,
the user interface elements further include another graphic of another one of the accessory mobile devices that has a form factor different from the one or more form factors of the at least one of the accessory mobile devices, and
the user interface elements further include another indication that another one of the applications as compatible with the another one of the accessory mobile devices yet not with the at least one of the accessory mobile devices.

11. An apparatus comprising:
at least one processor; and
at least one memory including computer program code for one or more programs,
the at least one memory and the computer program code configured to, with the at least one processor, cause the apparatus to perform at least the following,
cause, at least in part, a specification of one or more programming interfaces for enabling control of one or more applications via a mobile device and one or more accessory mobile devices;
cause, at least in part, a generation of one or more installation packages for the one or more applications for installation at the main mobile device and for installation at the one or more accessory mobile devices; and
cause, at least in part, a rendering of at least one user interface at the one or more accessory mobile devices,
wherein the at least one user interface includes one or more user interface elements graphically depicting that at least one of the applications and the main mobile device are compatible, but that the at least one of the applications and at least one of the accessory mobile devices are not compatible.

12. An apparatus of claim 11, wherein the apparatus is further caused to:
    cause, at least in part, the generation of the one or more installation packages for the main mobile device based, at least in part, on a main mobile device operating system and one or more form factors relating to compatibility between at least one of the applications and the main mobile device; and
    cause, at least in part, the generation of the one or more installation packages for the one or more accessory mobile devices based, at least in part, on an accessory mobile device operating system and the compatibility,
    wherein the compatibility is determined, at least in part, on one or more form factors of the at least one of the accessory mobile devices.

13. An apparatus of claim 11, wherein the apparatus is further caused to:
    determine to package the one or more installation packages into a combined installation package,
    wherein the one or more installation packages comprise at least one installation package for installation at the main mobile device and at least one other installation package for installation at the one or more accessory mobile devices, and
    wherein an installation of the combined installation package causes, at least in part, an initiation of respective installations of the one or more installation packages at the main mobile device, the one or more accessory mobile devices, or a combination thereof.

14. An apparatus of claim 12, wherein the apparatus is further caused to:
    cause, at least in part, a recommendation of the one or more applications to be downloaded to the one or more accessory mobile devices based, at least in part, on the one or more form factors of the at least one of the accessory mobile devices,
    wherein the at least one user interface includes one or more other user interface elements for enabling control of the one or more applications active on the main mobile device.

15. An apparatus of claim 14, wherein the at least one user interface, the one or more user interface elements, or a combination thereof operate as one or more alternative controls, one or more additional controls, or a combination thereof to at least one other user interface, one or more other user interface elements, or a combination thereof rendered at the main mobile device.

16. An apparatus of claim 11, wherein the apparatus is further caused to:
    cause, at least in part, a transmission of one or more notifications, one or more actions, or a combination thereof associated with the one or more applications between the main mobile device and the one or more accessory mobile devices via the one or more programming interfaces.

17. An apparatus of claim 11, wherein the one or more programming interfaces are part of a software development platform including, at least in part, one or more application stores, and
    the user interface elements include a graphic of the at least one of the accessory mobile devices and an indication that at least another one of the applications as compatible with the at least one of the accessory mobile devices and the main mobile device.

18. An apparatus of claim 14, wherein the apparatus is further caused to:
    cause, at least in part, an association of metadata with the one or more applications,
    wherein the metadata data includes, at least in part, compatibility information associated with the main mobile device, the one or more accessory mobile devices, or a combination thereof, that includes the one or more form factors relating to compatibility with the at least one of the accessory mobile devices.

19. A method of claim 11, wherein the main mobile device and the one or more accessory mobile devices communicate over a wireless network.

20. A method of claim 10, wherein the another indication depicts the another one of the applications as downloadable only to the another one of the accessory mobile devices.

* * * * *